United States Patent
Hu et al.

(10) Patent No.: US 12,313,408 B2
(45) Date of Patent: May 27, 2025

(54) MEMS GYROSCOPE START-UP PROCESS AND CIRCUIT

(71) Applicants: STMicroelectronics, Inc., Coppell, TX (US); STMicroelectronics S.r.l., Agrate Brianza (IT)

(72) Inventors: Yamu Hu, Allen, TX (US); Naren K Sahoo, Frisco, TX (US); Pavan Nallamothu, Little Elm, TX (US); Deyou Fang, Frisco, TX (US); David McClure, Carrollton, TX (US); Marco Garbarino, Cusago (IT)

(73) Assignees: STMicroelectronics, Inc., Coppell, TX (US); STMicroelectronics S.r.l., Agrate Brianza (IT)

( * ) Notice: Subject to any disclaimer, the term of this patent is extended or adjusted under 35 U.S.C. 154(b) by 372 days.

(21) Appl. No.: 17/712,718

(22) Filed: Apr. 4, 2022

(65) Prior Publication Data
US 2023/0314138 A1    Oct. 5, 2023

(51) Int. Cl.
*G01C 19/5726*    (2012.01)
*G01C 19/5762*    (2012.01)

(52) U.S. Cl.
CPC ..... *G01C 19/5726* (2013.01); *G01C 19/5762* (2013.01)

(58) Field of Classification Search
None
See application file for complete search history.

(56) References Cited

U.S. PATENT DOCUMENTS

| | | |
|---|---|---|
| 11,162,790 B2 | 11/2021 | Fang et al. |
| 2005/0264366 A1 | 12/2005 | Zivanovic et al. |
| 2011/0146402 A1 | 6/2011 | Donadel et al. |
| 2011/0146403 A1 | 6/2011 | Rizzo Piazza Roncoroni et al. |

(Continued)

FOREIGN PATENT DOCUMENTS

DE    102011119949 A1    6/2013

OTHER PUBLICATIONS

Shaeffer, "MEMS Inertial Sensors: A Tutorial Overview," IEEE Communications Magazine, Apr. 2013.

(Continued)

*Primary Examiner* — Patrick Assouad
*Assistant Examiner* — Mark A Shabman
(74) *Attorney, Agent, or Firm* — Crowe & Dunlevy LLC (57) ABSTRACT

At start-up of a microelectromechanical system (MEMS) gyroscope, the drive signal is inhibited, and the phase, frequency and amplitude of any residual mechanical oscillation is sensed and processed to determine a process path for start-up. In the event that the sensed frequency of the residual mechanical oscillation is a spurious mode frequency and a quality factor of the residual mechanical oscillation is sufficient, an anti-phase signal is applied as the MEMS gyroscope drive signal in order to implement an active dampening of the residual mechanical oscillation. A kicking phase can then be performed to initiate oscillation. Also, in the event that the sensed frequency of the residual mechanical oscillation is a resonant mode frequency with sufficient drive energy, a quadrature phase signal with phase lock loop frequency control and amplitude controlled by the drive energy is applied as the MEMS gyroscope drive signal in order to induce controlled oscillation.

13 Claims, 4 Drawing Sheets

(56) References Cited

U.S. PATENT DOCUMENTS

| | | |
|---|---|---|
| 2012/0312095 A1 | 12/2012 | Hanson et al. |
| 2014/0190258 A1 | 7/2014 | Donadel et al. |
| 2015/0211857 A1* | 7/2015 | Ruf .................. G01C 19/56 |
| | | 73/504.12 |
| 2015/0226556 A1 | 8/2015 | Aaltonen |
| 2016/0010994 A1 | 1/2016 | Ackerman |
| 2016/0341762 A1* | 11/2016 | Waters .............. G01P 15/125 |
| 2016/0349056 A1 | 12/2016 | Thompson et al. |
| 2020/0408523 A1* | 12/2020 | Fang ................. G01C 19/56 |

OTHER PUBLICATIONS

EPO Search Report and Written Opinion for counterpart EP Appl. No. 23162780.3, report dated Dec. 12, 2023, 10 pgs.

* cited by examiner

MEMS GYROSCOPE START-UP PROCESS AND CIRCUIT

TECHNICAL FIELD

The present invention generally relates to a microelectromechanical system (MEMS) sensor of a gyroscope type and, in particular, to a start-up process for ensuring oscillation of the driving mass in a desired resonant mode.

BACKGROUND

A capacitive microelectromechanical system (MEMS) gyroscope sensor is a complex electromechanical structure that includes two mobile masses that are moveable with respect to a stator body and are coupled to one another to have a relative degree of freedom. The two mobile masses are both capacitively coupled to the stator body. A first one of the mobile masses (referred to as the driving mass) is dedicated to driving and is kept in oscillation at a resonance frequency. The second one of the mobile masses (referred to as the sensing mass) is drawn along in oscillating motion due to the coupling to the driving mass. In the case of a rotation of the structure with respect to a predetermined gyroscope axis with an angular velocity, the sensing mass is subjected to a Coriolis force proportional to the angular velocity itself. A change in capacitance with respect to the sensing mass is sensed to detect the angular motion (rotation).

Figure 1:
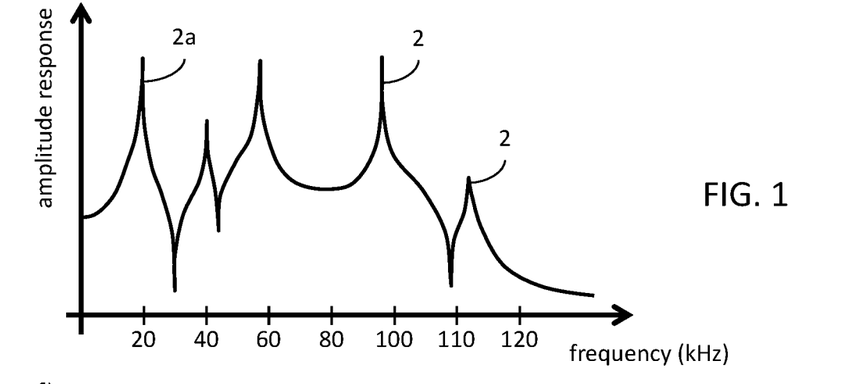
FIG. 1 illustrates a graph of driving mass amplitude response as a function of frequency for an example MEMS gyroscope.

Because the MEMS gyroscope is a coupled spring-mass-damper system, it intrinsically possesses a plurality of resonant modes. This is shown by FIG. 1 which illustrates a graph of driving mass amplitude response as a function of frequency for an example MEMS gyroscope, where each peak 2 is indicative of an intrinsic resonant mode at a corresponding intrinsic resonant frequency. Start-up of the MEMS gyroscope needs to be carefully controlled in order to ensure that the driving mass is oscillating in normal functional mode at or near the resonant frequency of the desired resonant mode (for example, reference 2a) of the plurality of intrinsic resonant modes. The desired resonant mode may, for example, be the anti-phase drive mode which is desired to minimize rate output error due to common-mode trans-linear motion of the sensing mass.

Figure 2:
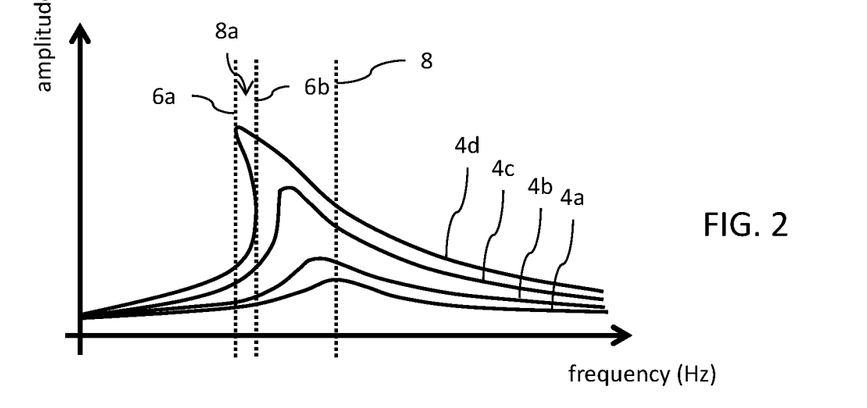
FIG. 2 plots oscillation frequency response for a plurality of drive amplitudes.

Another concern with MEMS gyroscope operation is that the oscillation frequency has a dependency on oscillation amplitude. At higher excitation levels of the driving mass, the peak frequency shifts and the functional relationship between amplitude and frequency is no longer a single-valued function. This is referred to in the art as the duffing effect and is illustrated in the graph of FIG. 2 which plots oscillation frequency response for a plurality of oscillation amplitudes. For oscillation amplitudes 4a-4c, for example, there exists a single-valued functional relationship between amplitude and frequency (noting that the peak frequency shifts lower than the resonant frequency 8 for increasing oscillation amplitudes). However, for drive amplitude 4d the response exhibits a frequency hysteresis and unstable operation where the oscillation can have a value at and/or between two different frequencies 6a, 6b that are offset from the resonant frequency 8. The amplitude of oscillation must be controlled during start-up of the MEMS gyroscope in order to ensure that the unstable operation region 8a where oscillation frequency hysteresis is present is avoided.

U.S. Pat. No. 11,162,790 (incorporated herein by reference) teaches a process for MEMS gyroscope start-up which includes the steps shown in FIG. 3.

Figure 3:
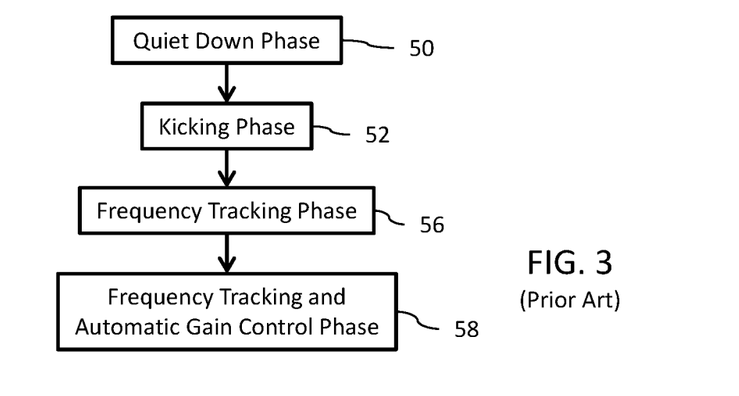
FIG. 3 shows a flow diagram for a start-up process in accordance with the teaching of U.S. Pat. No. 11,162,790.

In a first phase 50 of the start-up process, referred to as the quiet down phase, no drive force through the MEMS drive signal is applied and a delay is implemented to permit any residual mechanical oscillation of the driving mass and sensing mass of the MEMS gyroscope to dampen (i.e., to dissipate or quiet down). In this regard, the quieting of the driving mass and sensing mass refers to a reduction in the amplitude of oscillation. Oscillation of the driving mass is monitored, and further start-up actions are delayed until the sensed oscillation amplitude has quieted to at least a desired degree (i.e., the oscillation amplitude is decayed to a minimal or negligible level). The quiet down condition may, for example, be satisfied when the sensed oscillation amplitude of the driving mass is at or below a quiet threshold amplitude.

In a second phase 52 of start-up, referred to as the kicking phase, the driving mass is driven by a drive signal having a fixed amplitude and with a kicking frequency at an initial frequency that is chosen to be close to the a priori unknown actual resonance frequency of the desired resonant mode of the plurality of intrinsic resonant modes for the mechanical oscillation of the driving mass of the MEMS gyroscope. The kicking frequency of the drive signal is then varied (for example, increased or decreased by a frequency sweeping operation from the initial frequency) to approach the frequency of the desired resonant mode. With reference to FIG. 1, and the desired resonant mode (reference 2a) of the plurality of intrinsic resonant modes (reference 2), the initial frequency for the drive signal is selected with a frequency offset that is below (i.e., lower than) the resonance frequency (at about 20 kHz) associated with the desired resonant mode. The variation in the kicking frequency of the drive signal is accordingly an increase by frequency stepping or frequency sweeping from the initial frequency towards the desired resonant mode frequency. Alternatively, the initial frequency for the drive signal is selected with a frequency offset that is above (i.e., higher than) the resonance frequency (at about 20 kHz) associated with the desired resonant mode. The variation in the kicking frequency of the drive signal is accordingly a decrease by frequency stepping or frequency sweeping from the initial frequency towards the desired resonant mode frequency. The amplitude of the mechanical oscillation of the driving mass in response to the applied drive signal at the selected kicking frequency is monitored and the second phase 52 of start-up terminates when the sensed amplitude of the mechanical oscillation in response to the varying kicking frequency for the applied drive signal is larger than a preset amplitude threshold.

In a third phase 56 of start-up, referred to as the frequency tracking phase, the drive signal is set with a fixed amplitude and the frequency of the drive signal is controlled to match the measured oscillation frequency (which corresponds, for example, to the oscillation frequency at the end of the second phase) and thus sustain mechanical oscillation at or substantially equal to a frequency of the desired one of the plurality of intrinsic resonant modes. The phase of the drive signal is controlled with a 90° phase shift relative to the measured phase of mechanical oscillation, to drive the driving mass with a positive mechanical-electrical feedback loop. This positive feedback loop will sustain a mechanical oscillation having a sensed oscillation frequency that is at or near the frequency associated with the desired resonant mode, and the displacement amplitude of the driving mass will increase in an exponential manner due to the positive feedback. Oscillation of the driving mass is monitored to sense amplitude of the mechanical oscillation of the driving mass and the third phase 56 of start-up terminates when the exponentially increasing sensed oscillation amplitude reaches a threshold amplitude.

In a fourth phase 58 of start-up, referred to as the frequency tracking and automatic gain control phase, the frequency tracking operation of the third phase is maintained (i.e., the frequency of the drive signal is kept the same as the measured frequency, and the phase of the drive signal Ds is controlled to sustain the oscillation at or near to the desired frequency). The driving force, in a differential driving mode, is proportional to the product of the DC voltage of drive signal and the sinusoidal (AC) amplitude of the drive signal. In this fourth phase, either the DC voltage of drive signal, or the AC amplitude of drive signal, is gain controlled by a negative feedback to cause the displacement amplitude of the mechanically oscillating driving mass to settle to a desired amplitude; where, notably and importantly, the amplitude is not within the unstable operation region where hysteresis in resonance frequency exists (see, region 8*a* of FIG. 2). This amplitude control procedure is widely known as Automatic Gain Control (AGC) to those skilled in the art. The mechanical oscillation of the driving mass is then monitored to sense the oscillation amplitude, frequency and phase; and these sensed characteristics are used by the frequency tracking and AGC circuitry to sustain a mechanical oscillation at the measured frequency (that is at or equal to the desired frequency) and drive the amplitude of the oscillation to meet the desired amplitude. Once the sensed oscillation amplitude reaches the desired constant amplitude, proper gyroscope drive oscillation is fully established, and the start-up process ends. Frequency tracking and AGC will continue to work thereafter for the whole operation time of gyroscope during the normal functional operating mode in which angular rate measurements are made.

There is a need in the art for further development in controlling start-up of a MEMS gyroscope sensor.

SUMMARY

In an embodiment, a method for start-up of a microelectromechanical system (MEMS) gyroscope comprises: not applying a drive signal to the MEMS gyroscope; sensing phase, frequency and amplitude of a residual mechanical oscillation of the MEMS gyroscope while the drive signal is not applied; determining that the sensed frequency of the residual mechanical oscillation is a spurious mode frequency that is offset from a resonance frequency of a desired resonant mode; determining a quality factor of the residual mechanical oscillation from the sensed amplitude of the residual mechanical oscillation; and when the sensed frequency is the spurious mode frequency and the determined quality factor exceeds the quality factor threshold, then: applying as the drive signal to the MEMS gyroscope an anti-phase signal with a frequency corresponding to the sensed frequency and a phase that is 180° out of phase with the sensed phase of the residual mechanical oscillation.

An embodiment further comprises a start-up controller for a microelectromechanical system (MEMS) gyroscope configured to implement the foregoing method.

In an embodiment, a method for start-up of a microelectromechanical system (MEMS) gyroscope comprises: not applying a drive signal to the MEMS gyroscope; sensing phase, frequency and amplitude of a residual mechanical oscillation of the MEMS gyroscope while the drive signal is not applied; determining that the sensed frequency of the residual mechanical oscillation is a resonant mode frequency corresponding to a resonance frequency of a desired resonant mode; determining a drive energy of the residual mechanical oscillation from the sensed amplitude of the residual mechanical oscillation; and when the sensed frequency is the resonant mode frequency and the determined drive energy is within a first range, then: applying as the drive signal to the MEMS gyroscope a first signal to induce mechanical oscillation, said first signal having a frequency corresponding to said sensed frequency, a phase that is 90° out of phase with the sensed phase, and an amplified amplitude.

An embodiment further comprises a start-up controller for a microelectromechanical system (MEMS) gyroscope configured to implement the foregoing method.

In an embodiment, a method for start-up of a microelectromechanical system (MEMS) gyroscope comprises: not applying a drive signal to the MEMS gyroscope; sensing phase, frequency and amplitude of a residual mechanical oscillation of the MEMS gyroscope while the drive signal is not applied; determining that the sensed frequency of the residual mechanical oscillation is a resonant mode frequency corresponding to a resonance frequency of a desired resonant mode; determining a drive energy of the residual mechanical oscillation from the sensed amplitude of the residual mechanical oscillation; and when the sensed frequency is the resonant mode frequency and the determined drive energy is within a second range, then: applying a second signal as the drive signal to the MEMS gyroscope to control mechanical oscillation, said second signal having a frequency set by a phase lock loop from a reference signal, a phase that is 90° out of phase with the sensed phase, and an amplitude that is a maximum amplitude of a signal driver for said drive signal.

An embodiment further comprises a start-up controller for a microelectromechanical system (MEMS) gyroscope configured to implement the foregoing method.

In an embodiment, a method for start-up of a microelectromechanical system (MEMS) gyroscope comprises: not applying a drive signal to the MEMS gyroscope; sensing phase, frequency and amplitude of a residual mechanical oscillation of the MEMS gyroscope while the drive signal is not applied; determining that the sensed frequency of the residual mechanical oscillation is a resonant mode frequency corresponding to a resonance frequency of a desired resonant mode; determining a drive energy of the residual mechanical oscillation from the sensed amplitude of the residual mechanical oscillation; and when the sensed frequency is the resonant mode frequency and the determined drive energy is within a third range, then: applying a third signal as the drive signal to the MEMS gyroscope to control mechanical oscillation, said third signal having a frequency set by a phase lock loop from a reference signal, a phase that is 90° out of phase with the sensed phase, and an amplitude that is automatic gain controlled in response to the sensed amplitude.

An embodiment further comprises a start-up controller for a microelectromechanical system (MEMS) gyroscope configured to implement the foregoing method.

In an embodiment, a method for start-up of a microelectromechanical system (MEMS) gyroscope comprises: quieting residual mechanical oscillation of the MEMS gyroscope; applying a kicking signal as a drive signal to the MEMS gyroscope to start mechanical oscillation; sensing phase, frequency and amplitude of the mechanical oscillation; applying a first signal as the drive signal to the MEMS gyroscope to induce mechanical oscillation, said first signal having a frequency corresponding to said sensed frequency, a phase that is 90° out of phase with the sensed phase, and an amplified amplitude; sensing a locking of the phase lock loop; then applying a second signal as the drive signal to the MEMS gyroscope to control mechanical oscillation, said second signal having the frequency set by the phase lock loop from the reference signal, the phase that is 90° out of phase with the sensed phase, and an amplitude that is a maximum amplitude of a signal driver for said drive signal; sensing an increase in the sensed amplitude of the residual mechanical oscillation to exceed an amplitude threshold level; and then applying a third signal as the drive signal to the MEMS gyroscope to control mechanical oscillation, said third signal having the frequency set by the phase lock loop from the reference signal, the phase that is 90° out of phase with the sensed phase, and an amplitude that is automatic gain controlled in response to the sensed amplitude.

An embodiment further comprises a start-up controller for a microelectromechanical system (MEMS) gyroscope configured to implement the foregoing method.

BRIEF DESCRIPTION OF THE DRAWINGS

For a better understanding of the embodiments, reference will now be made by way of example only to the accompanying figures in which.

DETAILED DESCRIPTION

Figure 4:
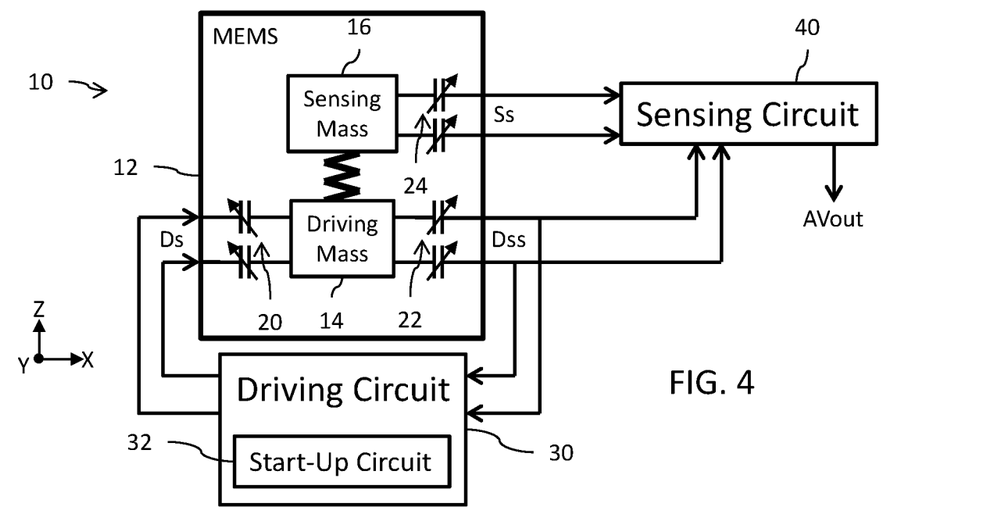
FIG. 4 is a block diagram of a MEMS gyroscope sensor.

FIG. 4 shows a block diagram of a MEMS gyroscope sensor 10. The sensor 10 includes a MEMS microstructure 12 with a stator body, a driving mass 14 and a sensing mass 16. For simplicity, the MEMS microstructure 12 illustrates the case of a uniaxial gyroscope in which only one sensing mass 16 is present, although the configuration and operation is equally applicable to multi-axial gyroscopes with multiple sensing masses. The driving mass 14 is elastically constrained to the stator body and controlled to oscillate about a rest position according to one degree of freedom shown by the X-axis (also referred to as the driving axis). In this regard, the driving mass and stator body define a resonant mechanical system which exhibits a plurality of intrinsic resonant modes with corresponding intrinsic resonant frequencies. The sensing mass 16 is mechanically coupled to the driving mass 14 and will be driven in motion according to the same degree of freedom (i.e., in the X-axis). Moreover, the sensing mass 16 is elastically coupled to the driving mass 14 and may oscillate in turn with respect to the driving mass according to another degree of freedom shown by the Y-axis (also referred to as the sensing axis). When a rotational rate in the Z-axis is applied to the microstructure 12, the induced Coriolis force will cause the sensing mass 16 to oscillate in the Y-axis.

The driving mass 14 and sensing mass 16 are capacitively coupled to the stator body. In particular, the driving mass 14 is capacitively coupled to the stator body through a set of driving capacitors 20 which are connected to drive actuation electrodes and a set of drive sensing capacitors 22 which are connected to drive sense electrodes. The driving capacitors 20 are configured to respond to an applied differential oscillating drive signal Ds by applying an electrostatic force to induce oscillatory movement of the mobile masses in the X-axis. The drive sensing capacitors 22 are configured such that their capacitance depends in a differential way on the position of the driving mass 14 with respect to the stator body relative to the X-axis, and thus signals generated by the sensing capacitors 24 are indicative of movement of the driving mass 14 relative to the X-axis. The sensing mass 16 is capacitively coupled to the stator body through a set of sensing capacitors 24 which are connected to sensing electrodes. The sensing capacitors 24 are configured such that their capacitance depends in a differential way on the position of the sensing mass 16 with respect to the stator body relative to the Y-axis, and thus signals generated by the sensing capacitors 24 are indicative of movement relative to the Y-axis.

An application specific integrated circuit (ASIC) is electrically connected to the MEMS microstructure 12. The ASIC of the sensor 10 includes a driving circuit 30 having an input coupled to the drive sense electrodes for the drive sensing capacitors 22 to receive a differential drive sense signal Dss (which is indicative of driving mass 14 mechanical oscillation amplitude and frequency) and an output coupled to the drive actuation electrodes for the driving capacitors 20 to apply the drive signal Ds (which is used to apply the drive force which induces driving mass oscillation at or near a desired resonance frequency of the plurality of intrinsic resonance frequencies). This coupling in feedback forms an oscillating microelectro-mechanical loop that is configured to sustain the driving mass 14 in oscillation at or substantially near the desired resonance frequency and with a controlled amplitude. The ASIC of the sensor 10 further includes a sensing circuit 40 having a first input coupled to the drive sense electrodes for the drive sensing capacitors 22 and a second input coupled to the sensing electrodes for the sensing capacitors 24. The sensing circuit 40 receives a differential sense signal Ss generated by the sensing capacitors 24 and indicative of displacement of the sensing mass 16 relative to the Y-axis, demodulates the differential sense signal Ss in response to the differential drive sense signal Dss generated by the drive sensing capacitors 22, and outputs a signal indicative of sensed angular velocity (AVout) as a result of that demodulation.

Because it is not a focus of the present invention, details concerning quadrature error compensation control of the sensing mass 16 are omitted. Quadrature error compensation techniques are well-known to those skilled in the art.

As previously noted, it is important when starting up the MEMS gyroscope sensor 10 to ensure that the driving mass will oscillate at a frequency corresponding to (i.e., near or equal to) the resonance frequency of the desired resonant mode of the plurality of intrinsic resonant modes. The desired resonant mode may, for example, be the anti-phase drive mode. Still further, it is important at start-up to ensure that the amplitude of oscillation is controlled to avoid the unstable operation region where the frequency hysteresis exists. It is also important that the start-up process be completed as quickly as possible. The driving circuit 30 of the ASIC accordingly includes a start-up circuit 32 which swiftly operates to ensure proper resonant frequency oscillation and amplitude of the driving mass.

Figure 5A:
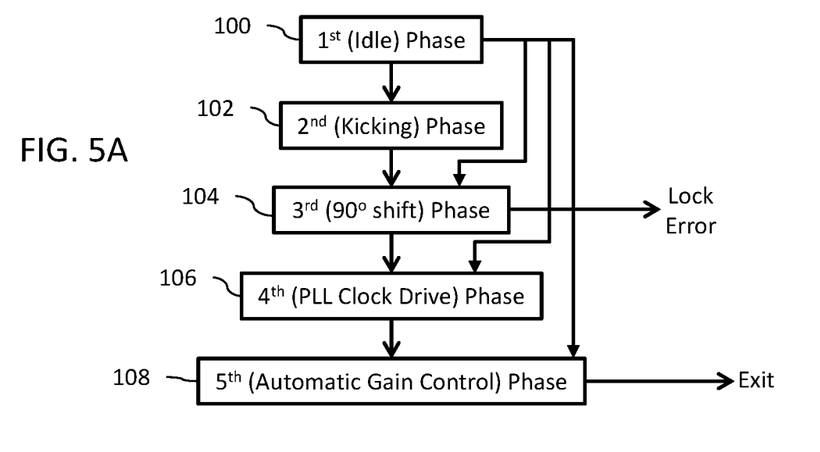
FIGS. 5A-5B show a flow diagram for a start-up process.
Figure 5B:
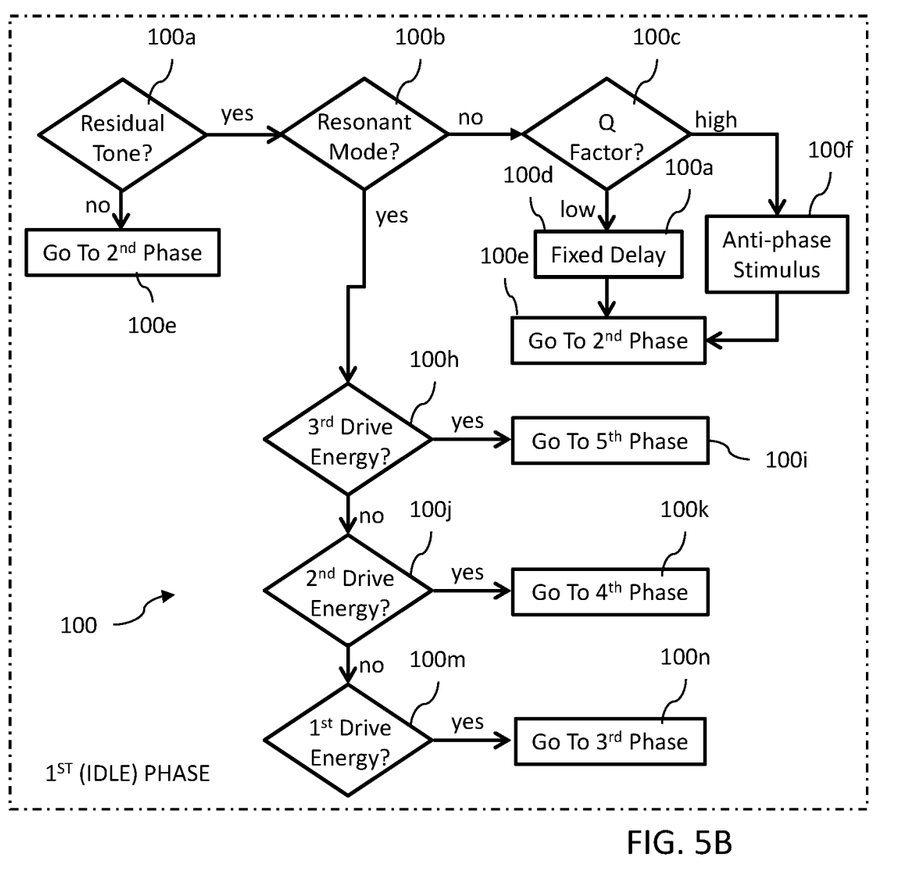

Reference is now made to FIGS. 5A-5B which show a flow diagram for a start-up process implemented by the start-up circuit 32.

In a first phase 100 of the start-up process, referred to as the idle phase, no drive force through the drive signal Ds is applied by the driving circuit 30. A delay (for example, of a pre-set duration of time) is implemented to permit any residual mechanical oscillation of the mobile masses 14 and 16 of the MEMS microstructure 12 to dampen (i.e., to dissipate or quiet down). During this delay time, the start-up circuit 32 of the driving circuit 30 can monitor the mechanical oscillation of the driving mass through the differential drive sense signal Dss and take specific actions for start-up processes based on the sensed driving mass oscillation state.

If a residual tone is detected in the differential drive sense signal Dss (step 100a—"yes") for the monitored mechanical oscillation, and that detected residual tone is not at (or sufficiently near to) the resonant frequency of the desired resonant mode (i.e., it is a spurious mode frequency) (step 100b—"no"), the start-up circuit 32 of the driving circuit 30 will continue to not apply a drive force through the drive signal Ds (i.e., the drive signal Ds is inhibited) and thus permit further dampening of the mechanical oscillation to occur.

The start-up circuit 32 will concurrently further evaluate the quality factor (Q) of the sensed spurious mode residual tone. This evaluation includes, for example, a sensing and digitizing of the amplitude of the spurious mode residual tone over a fixed time interval, with the Q factor calculated from the decay rate of the amplitude.

In the case where that sensed spurious mode residual tone has a low quality factor (Q), for example less than a Q factor threshold level (step 100c—"low"), the start-up circuit 32 will apply a fixed duration time delay (step 100d) to wait for mechanical oscillation dampening to be completed and then automatically transition operation to a second phase 102 of the start-up process (step 100e). Alternatively, the transition to the second phase 102 of the start-up process for step 100d can be conditioned on the sensed mechanical oscillation amplitude decaying to a value that is less than a dampened threshold value.

Figure 6:
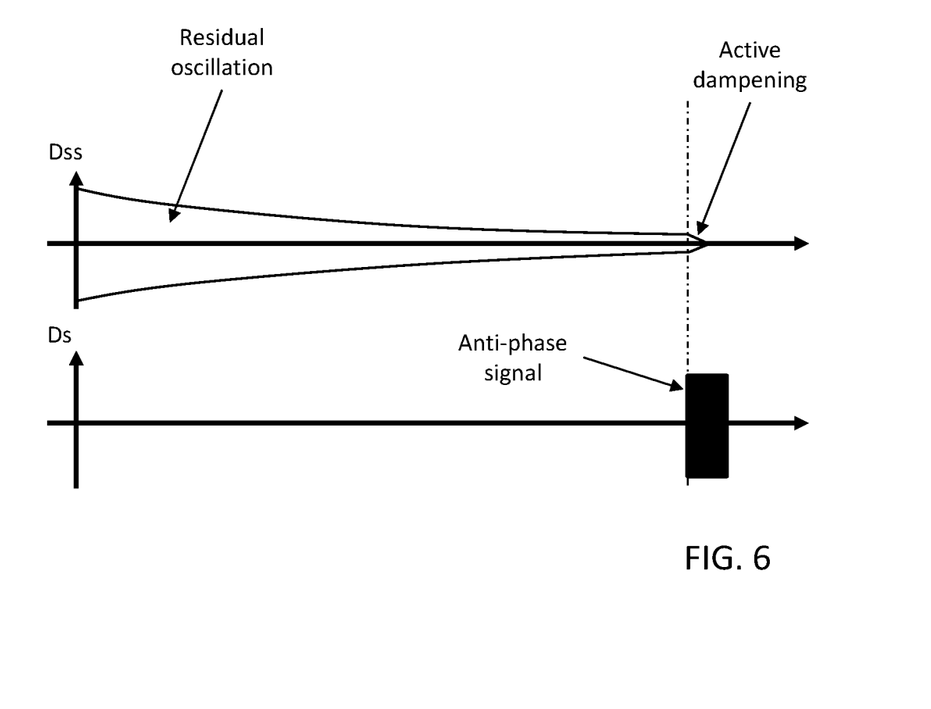
FIG. 6 graphically illustrates a part of the start-up process where an active dampening of MEMS oscillation is performed.

Conversely, if that sensed spurious mode residual tone has a high quality factor (Q), for example greater than the Q factor threshold level (step 100c—"high"), the start-up circuit 32 of the driving circuit 30 will apply an anti-phase stimulus signal for the drive signal Ds (step 100f) to the MEMS microstructure 12. The anti-phase stimulus signal has an amplitude, a frequency and a phase selected to cause an acceleration of the dampening of the residual mechanical oscillation of the mobile masses 14 and 16 of the MEMS microstructure 12. For example, the drive signal Ds is set with a fixed amplitude and the frequency of the drive signal Ds is controlled to match the oscillation frequency of the sensed spurious mode residual tone (i.e., matching the residual mechanical oscillation frequency as detected from the differential drive sense signal Dss). The phase of the anti-phase stimulus drive signal Ds is controlled by the driving circuit 30 to be 180° out of phase from the phase of the residual mechanical oscillation. The application of the anti-phase stimulus signal will actively dampen the residual mechanical oscillation towards zero (see FIG. 6 for an illustration of the active dampening of the residual mechanical oscillation in response to the anti-phase stimulus signal). Following completion of the application of the anti-phase stimulus signal, operation transitions to the second phase 102 of the start-up process (step 100e).

In an embodiment, the anti-phase stimulus signal for the drive signal Ds is generated to include a pre-set (for example, programmable) number of pulses, and thus also has a fixed active dampening duration. Alternatively, the anti-phase stimulus signal for the drive signal Ds is generated until the sensed mechanical oscillation amplitude is less than the dampened threshold value.

If the residual tone is detected in the differential drive sense signal Dss (step 100a—"yes"), and that detected residual tone is at (or sufficiently near to) the resonant frequency of the desired resonant mode (step 100b—"yes"), an evaluation is made of the amount of drive energy that is present according to the sensed mechanical oscillation amplitude. This evaluation can be made against any number of distinct drive energy levels or ranges. In an example embodiment, three drive energy levels or ranges (higher, intermediate, and lower) are evaluated.

If the detected residual tone has a third (higher) amount of drive energy according to sensed mechanical oscillation amplitude (step 100h), the operation transitions to a fifth phase 108 of the start-up process (step 100i). In this context, step 100h is satisfied when the sensed mechanical oscillation amplitude falls within a third (higher) amplitude range. Otherwise, the evaluation of the amount of drive energy for the resonant mode tone transitions to a next range (step 110h—"no").

If the detected residual tone has a second (intermediate) amount of drive energy according to sensed mechanical oscillation amplitude (step 100j), the operation transitions to a fourth phase 106 of the start-up process (step 100k). In this context, step 100j is satisfied when the sensed mechanical oscillation amplitude falls within a second (intermediate) amplitude range (lower than the third amplitude range). Otherwise, the evaluation of the amount of drive energy for the resonant mode tone transitions to a next range (step 110j—"no").

If the detected residual tone has a first (lower) amount of drive energy according to the sensed mechanical oscillation amplitude (step 100m—"yes"), the operation transitions to a third phase 104 of the start-up process (step 100n). In this context, step 100m is satisfied when the sensed mechanical oscillation amplitude falls within a first (lower) amplitude range (lower than the second amplitude range). In the event that the range for step 100m is not met, the process may transition to the second phase 102 of the start-up process (step 100e; note this path is not explicitly shown).

If no clear residual tones are detected in the differential drive sense signal Dss and drive energy in the differential drive sense signal Dss is less than a certain threshold energy level (step 100a—"no"; for example, where the drive energy does not satisfy any of the ranges associated with steps 100h, 100j or 100m), then residual mechanical oscillation of the mobile masses 14 and 16 is likely sufficiently dampened (or non-existent) and operation transitions to the second phase 102 of the start-up process (step 100e).

In the second phase 102 of start-up, referred to as the kicking phase, the start-up circuit 32 of the driving circuit 30 generates a kicking signal for the drive signal Ds having a fixed kicking amplitude and a fixed kicking frequency. In an embodiment, the fixed kicking frequency is chosen (for example, through a trimming operation as a result of a calibration) to be close to (either higher or lower than) the actual resonance frequency of the desired resonant mode of the plurality of intrinsic resonant modes for the mechanical oscillation of the driving mass 14 of the MEMS microstructure 12. The kicking signal for the drive signal Ds is generated to include a pre-set (for example, programmable)

number of pulses, and thus also has a fixed kicking duration. In an embodiment, the fixed kicking amplitude may be a maximum signal amplitude that the driving circuit 30 is capable of outputting for the drive signal Ds. Once the generation of the kicking signal for the drive signal Ds is completed (i.e., once the fixed kicking duration expires), the operation transitions to the third phase 104 of the start-up process.

It will be noted that second phase 102 of start-up with kicking uses a fixed frequency for the kicking signal, and thus differs from the second phase 52 of start-up in FIG. 3 where a variable (stepped or swept) frequency is used by the kicking signal. Furthermore, the duration of time with which the kicking signal is applied in second phase 102 is limited by a fixed time period.

In the third phase 104 of start-up, referred to as the 90° phase shift drive phase, the driving circuit 30 senses the mechanical oscillation through the differential drive sense signal Dss and generates the drive signal Ds to have an amplitude that is a multiple (for example, four times) the amplitude of the sensed mechanical oscillation reflected in the differential drive sense signal Dss. The drive signal Ds will have a frequency corresponding to the frequency of the differential drive sense signal Dss, but the phase of the drive signal Ds is controlled with a 90° phase shift relative to the phase of mechanical oscillation in order to drive the driving mass with a positive mechanical-electrical feedback loop. This positive feedback loop will sustain mechanical oscillation of the driving mass. A test is then made to detect whether a phase lock loop (PLL) circuit within the driving circuit 30 achieves a phase and frequency lock with respect to a reference frequency (Ref) within a lock time period. The reference frequency may, for example, be within a certain frequency range about the resonance frequency of the desired resonant mode. If lock is achieved within the lock time period, the operation transitions to the fourth phase 106 of the start-up process. Otherwise, a lock error signal is generated.

In the fourth phase 106 of start-up, referred to as the PLL clock drive phase, the driving circuit 30 generates the drive signal Ds to have a maximum amplitude level with a frequency controlled by the PLL circuit. Here, maximum amplitude level means the largest amplitude that the signal driver for signal Ds can produce. Again, the phase of the drive signal Ds is controlled with a 90° phase shift relative to the measured phase of mechanical oscillation, so as to drive the driving mass with a positive mechanical-electrical feedback loop, and the displacement amplitude of the driving mass will increase in an exponential manner due to the positive feedback. Oscillation of the driving mass is monitored to sense amplitude of the mechanical oscillation of the driving mass through the differential drive sense signal Dss. The sensed exponentially increasing amplitude is compared to a first threshold amplitude level (for example, this first threshold amplitude level may be set within the second amplitude range (step 100*j*)). When the first threshold amplitude level is reached, the operation transitions to the fifth phase 108 of the start-up process.

In the fifth phase 108 of start-up, referred to as the automatic gain control (AGC) phase, the frequency tracking operation of the fourth phase is maintained (i.e., the frequency of the drive signal is regulated by the PLL circuit to the reference frequency, and the phase of the drive signal Ds is controlled with a 90° phase shift relative to the measured phase of mechanical oscillation). The driving force, in a differential driving mode, is dependent on the amplitude of the drive signal Ds. This amplitude is gain controlled by a negative feedback to cause the displacement amplitude of the mechanically oscillating driving mass to settle to a desired amplitude; where, notably and importantly, the amplitude is not within the unstable operation region where hysteresis in resonance frequency exists (see, region 8*a* of FIG. 2). This amplitude control procedure is widely known as Automatic Gain Control (AGC) to those skilled in the art. The mechanical oscillation of the driving mass is then monitored to sense the oscillation amplitude, frequency and phase; and these sensed characteristics are used by the phase/frequency tracking, PLL and AGC circuitry in proportional-integral (PI) control loop to sustain a mechanical oscillation at the measured frequency (that is at or equal to the desired frequency) and drive the amplitude of the oscillation to meet the desired amplitude (without duffing). Once the sensed oscillation amplitude reaches a second threshold (or target) amplitude level (for example, this second threshold amplitude level may be set greater than the first threshold amplitude level and within the third amplitude range (step 100*h*)), proper gyroscope drive oscillation is fully established, and the start-up process ends and further operation transitions to quadrature control and self-testing. Frequency tracking and AGC will continue to work thereafter for the whole operation time of the gyroscope during a normal functional operating mode in which angular rate measurements are made using the sensing circuit 40.

The start-up process of FIGS. 5A-5B has a number of advantages over other start-up processes (like that of FIG. 3) in response to a power interruption scenario. The process path through steps 100*a* and 100*b* permits the system to take advantage of residual energy of the MEMS at or about the resonance frequency of the desired resonant mode when restarting to move quickly during the start-up process into the third, fourth or fifth phases 104, 106, 108 and thus bypass the time delays associated with the idle phase and kicking phase. Furthermore, even in the case where the process path through steps 100*a*, 100*b* and 100*c* detects residual energy of the MEMS at a spurious frequency, the step 100*f* operation to apply an active dampening when restarting will substantively shorten the amount of time spent in the idle phase 100 and allow entry into the kicking phase 102 to occur more quickly. The start-up process thus dynamically responds to the residual energy of the MEMS following a restart to pick the most time-efficient start-up process path.

The start-up process described herein advantageously: a) uses an active dampening action when appropriate to ensure that the MEMS starts from a quieted condition where unknown motion which could adversely affect achieving oscillation at or near the desired resonant mode is avoided; b) ensures that the MEMS oscillates at a drive mode corresponding to the desired resonant mode by eliminating the risk of locking to an unwanted parasitic mode; and c) intelligently minimizes the length of the start-up time period by taking in account residual oscillating state at time of restart and controlling the start-up process dependent on that state.

Figure 7:
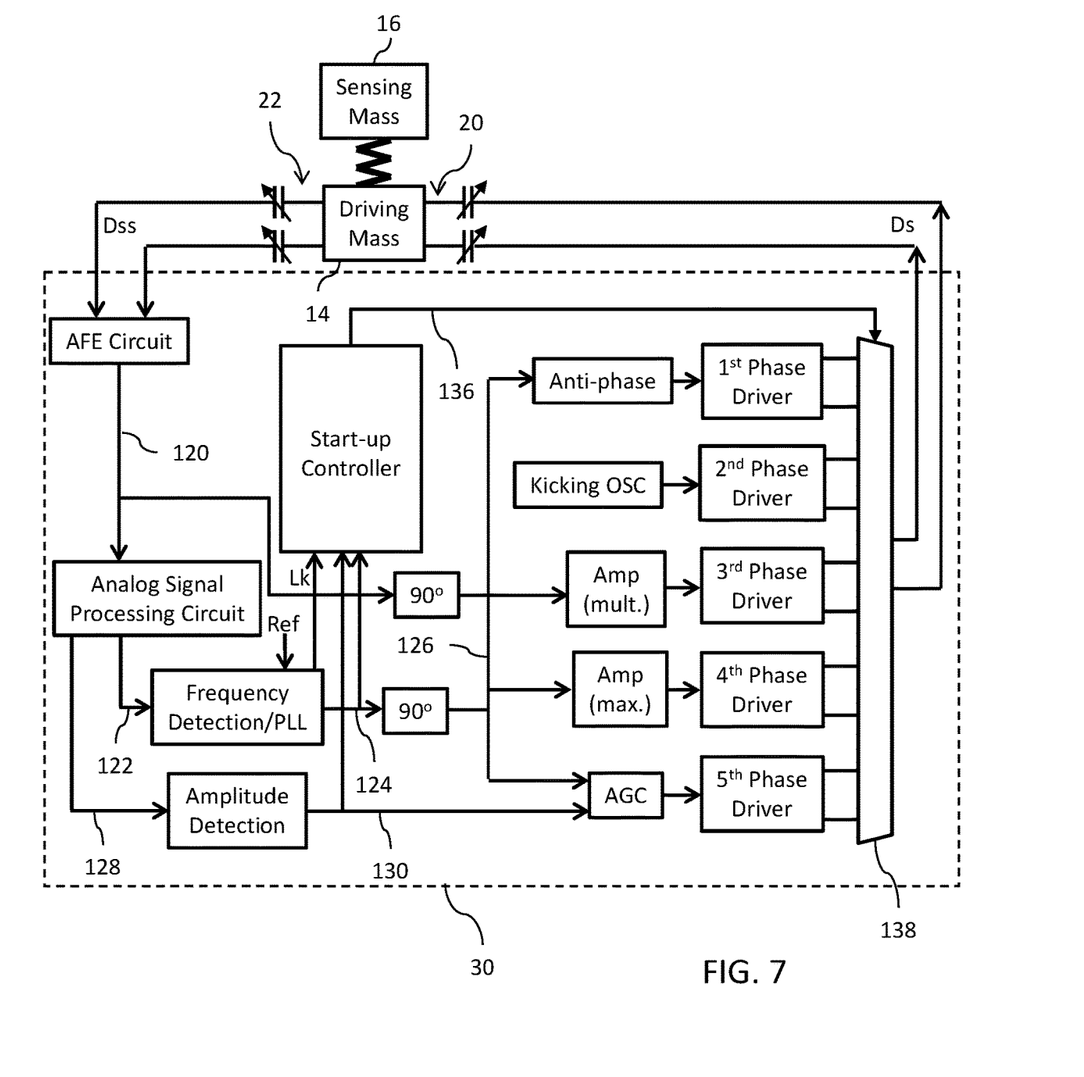
FIG. 7 shows a block diagram of a driving circuit which includes start-up functionality.

Reference is now made to FIG. 7 which shows a block diagram of the driving circuit 30 which includes the start-up circuit 32 functionality. It will be understood that this is just one example of circuitry for the driving circuit 30 which can implement the start-up process of FIGS. 5A-5B. The driving circuit 30 includes an analog front end (AFE) circuit having inputs coupled to the drive sensing capacitors 22 to receive the differential drive sense signal Dss (which is indicative of driving mass oscillation amplitude, frequency and phase). The AFE circuit generates an analog sinusoid signal 120 which oscillates at the frequency of the mechanical oscillation of the driving mass 14 of the MEMS microstructure 12. The AFE circuit may comprise, for example, a charge to voltage (C2V) converter circuit that operates to convert the sensed differential charge on the drive sensing capacitors 22 to output a corresponding analog voltage signal for the analog sinusoid signal 120 that is indicative of the oscillating motion of the driving mass.

The analog sinusoid signal 120 is input to an analog signal processing circuit that converts the analog sinusoid signal 120 into a clock signal 122 having a frequency corresponding to the frequency of the mechanical oscillation of the driving mass 14. A frequency detection and phase lock loop (PLL) circuit processes the clock signal 122 to generate a phase/frequency signal 124 which includes information concerning the measured phase of the mechanical oscillation of the driving mass 14 and includes information concerning the measured frequency of the mechanical oscillation of the driving mass 14. The PLL circuit will further generate a lock signal (Lk) when phase/frequency lock to the frequency reference (Ref) is obtained. A phase shifting circuit shifts the measured phase signal by 90° to generate a quadrature phase shifted signal 126. The PLL of this circuit can function to control the phase/frequency signal 124 to match phase and frequency of the reference signal Ref.

The analog processing circuit further demodulates the analog sinusoid signal 120 using a demodulation clock signal to output an analog amplitude signal 126 having a voltage corresponding to the amplitude of the mechanical oscillation. The analog amplitude signal 128 is processed in an amplitude detection circuit which includes an analog-to-digital converter (ADC) circuit that generates a digital amplitude signal that is digitally filtered to output an oscillation amplitude signal 130 specifying the measured amplitude of the mechanical oscillation of the driving mass 14 produced in response to the applied driving signal Ds.

A start-up controller circuit receives the phase/frequency signal 124 providing information concerning the measured phase and frequency of the mechanical oscillation of the driving mass 14 and receives the oscillation amplitude signal 130 providing information concerning the detected amplitude of the mechanical oscillation of the MEMS microstructure 12. The start-up controller circuit generates a selection signal 136 that is applied to control the selection operation performed by a multiplexer circuit 138. The multiplexer circuit 138 has a first input configured to receive a drive signal generated by a $1^{st}$ phase driver circuit, a second input configured to receive a drive signal generated by a $2^{nd}$ phase driver circuit, a third input configured to receive a drive signal generated by a $3^{rd}$ phase driver circuit, a fourth input configured to receive a drive signal generated by a $4^{th}$ phase driver circuit, and a fifth input configured to receive a drive signal generated by a $5^{th}$ phase driver circuit. The value of the selection signal 136 for multiplexer selection is generated in accordance with the start-up process (see FIGS. 5A-5B) in dependence on the phase/frequency signal 124 and the oscillation amplitude signal 130. The driving signal Ds is output from the multiplexer circuit 138 and applied to the MEMS microstructure 12 in response to the selected driving signal.

The $1^{st}$ phase driver circuit is associated with the step 100f operation of the first phase 100 of the start-up process for applying an anti-phase stimulus driving signal for the driving signal Ds. Through the use of a phase shifting circuit and an anti-phase circuit, the phase of the phase/frequency signal 124 is shifted by 180°, and a driving signal is generated by the $1^{st}$ phase driver circuit and applied to the input of the multiplexer circuit 138. This 180° phase shifted (anti-phase) drive signal is selectively passed by the multiplexer circuit 138 in response to the selection signal 136 and applied as the driving signal Ds to the MEMS microstructure 12 in connection with implementation of an active dampening operation to terminate residual mechanical oscillation of the mobile masses 14 and 16.

The $2^{nd}$ phase driver circuit is associated with the second phase 102 of the start-up process operation for applying a kicking signal for the drive signal Ds. An oscillator circuit is used to generate an oscillating signal having a fixed kicking amplitude and a fixed kicking frequency, and a driving signal is generated by the $2^{nd}$ phase driver circuit and applied to the input of the multiplexer circuit 138. This kicking signal is selectively passed by the multiplexer circuit 138 in response to the selection signal 136 and applied as the driving signal Ds to the MEMS microstructure 12 in connection with implementation of a kicking phase during start-up to instigate mechanical oscillation of the mobile masses 14 and 16.

The $3^{rd}$ phase driver circuit is associated with the third phase 104 of the start-up process operation for applying a drive signal Ds having an amplitude that is a multiple (for example, four times) of the amplitude of the differential drive sense signal Dss and a frequency corresponding to the frequency of the differential drive sense signal Dss. The differential drive sense signal Dss is sensed by the C2V converter of the analog front end to generate the analog sinusoid signal 120 (having a frequency corresponding to the frequency of the mechanical oscillation of the driving mass 14) which is phase shifted by 90° and amplified by an amplifier circuit to control the amplitude to be a desired multiple (for example, four times), and a driving signal is generated in response thereto by the $3^{rd}$ phase driver circuit for application to the input of the multiplexer circuit 138. This driving signal is selectively passed by the multiplexer circuit 138 in response to the selection signal 136 and applied as the driving signal Ds to the MEMS microstructure 12 to transition mechanical oscillation of the mobile masses 14 and 16 towards a frequency set by the reference frequency of the PLL circuit which is at or about the resonance frequency of the desired resonant mode. The lock signal Lk is generated by the PLL when phase/frequency lock is obtained.

The $4^{th}$ phase driver circuit is associated with the fourth phase 106 of the start-up process operation for applying a drive signal Ds having a maximum amplitude level with a frequency and phase controlled by the PLL of the frequency detection and phase lock loop circuit. Here, maximum amplitude level means the largest amplitude that the signal driver for signal Ds can produce. The quadrature phase shifted signal 126 is amplified by an amplifier circuit that applies a maximum amplification (for example, much greater than the amplification of the amplifier associated with the $3^{rd}$ phase driver circuit), and a driving signal is generated by the $4^{th}$ phase driver circuit and applied to the input of the multiplexer circuit 138. This driving signal is selectively passed by the multiplexer circuit 138 in response to the selection signal 136 and applied as the driving signal Ds to the MEMS microstructure 12 to induce an exponential increase in the amplitude of the mechanical oscillation of the mobile masses 14 and 16.

The $5^{th}$ phase driver circuit is associated with the fifth phase 108 of the start-up process operation for applying a drive signal Ds with a frequency and phase controlled by the PLL of the frequency detection and phase lock loop circuit. An automatic gain control circuit compares the oscillation amplitude signal 130 which is indicative of the amplitude of the mechanical oscillation of the mobile masses 14 and 16 to a reference amplitude and controls the amplitude of a drive signal in negative feedback, and a driving signal is generated by the $5^{th}$ phase driver circuit and applied to the input of the multiplexer circuit 138. This driving signal is selectively passed by the multiplexer circuit 138 in response to the selection signal 136 and applied as the driving signal Ds to the MEMS microstructure 12 to provide for frequency tracking and automatic gain control.

Operation of the circuitry of the driving circuit 30 to implement the start-up process provided by the start-up circuit 32 is as follows:

In the first phase 100 of the start-up process, the selection signal 136 output by the start-up controller circuit controls the multiplexer circuit 138 to not select any of the inputs so that there is no drive force (i.e., the driving signal Ds to the MEMS microstructure 12 is null) being applied to the driving mass 14. In the absence of the drive force, any residual mechanical oscillation of the mobile masses 14 and 16 of the MEMS microstructure 12 will decay. The start-up controller circuit can then monitor the oscillation amplitude signal 130 (providing information concerning the detected amplitude of the residual mechanical oscillation) and can monitor the phase/frequency signal 124 (providing information concerning a detected phase/frequency of the residual mechanical oscillation) in connection with performing the tests of steps 100a, 100b, 100h, 100j and 100m and the determination of the Q-factor in step 100c.

The start-up controller circuit may determine that the tone frequency indicated by the phase/frequency signal 124 is a spurious tone (offset from the frequency of the desired resonant mode) (step 100b—"no"), and further evaluate the Q factor from the sensed amplitude, and then for the implementation of step 100f, the selection signal 136 output by the start-up controller circuit controls the multiplexer circuit 138 to select the input coupled to the $1^{st}$ driver circuit which is configured to output a drive signal at a frequency that matches the oscillation frequency of the sensed spurious tone, but which is controlled through the phase shifter and anti-phase circuit to be 180° out of phase from the phase of the residual mechanical oscillation. In response, the residual oscillation of the driving mass 14 will be actively dampened. The start-up process then moves to the second phase 102.

In the event that the start-up controller circuit determines that the tone frequency indicated by the phase/frequency signal 124 is at (or near) the frequency of the desired resonant mode (step 100b—"yes") and the amplitude indicated by the oscillation amplitude signal 130 falls within the third amplitude range (step 100h—"yes"), the start-up process then moves to the fifth phase 108.

In the event that the start-up controller circuit determines that the phase/frequency signal 124 is at (or near) the frequency of the desired resonant mode (step 100b—"yes") and the amplitude indicated by the oscillation amplitude signal 130 falls within the second amplitude range (step 100j—"yes"), the start-up process then moves to the fourth phase 106.

In the event that the start-up controller circuit determines that the phase/frequency signal 124 is at (or near) the frequency of the desired resonant mode (step 100b —"yes") and the amplitude indicated by the oscillation amplitude signal 130 falls within the first amplitude range (step 100m—"yes"), the start-up process then moves to the third phase 104.

In the second phase 102 of start-up, the selection signal 136 output by the start-up controller circuit controls the multiplexer circuit 138 to select the input coupled to the $2^{nd}$ driver circuit which is configured through the kicking oscillator to output a drive signal at the kicking frequency and kicking amplitude. The start-up controller circuit controls application of the kicking signal for a limited time duration (set for example by a certain number of consecutive pulses). In response, the driving mass 14 will begin to oscillate. The start-up process then moves to the third phase 104.

In the third phase 104 of start-up, the selection signal 136 output by the start-up controller circuit controls the multiplexer circuit 138 to select the input coupled to the $3^{rd}$ driver circuit which is configured to output a drive signal having a frequency corresponding to the frequency of the analog sinusoid signal 120 (i.e., having a frequency corresponding to the frequency of the mechanical oscillation of the driving mass 14) and a phase which is 90° shifted from the phase of the analog sinusoid signal 120 (i.e., quadrature phase shifted from the mechanical oscillation of the driving mass 14). The drive signal further has an amplitude that is a fixed multiple (for example, four times) the analog sinusoid signal 120 amplitude. In response, the driving mass 14 will transition towards oscillation at the desired resonance frequency. An output of the PLL circuit provides signal Lk which is indicative of the lock state (i.e., when the sensed frequency/phase of mechanical oscillation matches the PLL reference signal Ref frequency/phase), and this lock signal Lk is monitored by the start-up controller circuit. If lock fails, an error signal is generator. When lock is successful, the start-up process moves to the fourth phase 106.

In the fourth phase 106 of start-up, the selection signal 136 output by the start-up controller circuit controls the multiplexer circuit 138 to select the input coupled to the $4^{th}$ driver circuit which is configured to output a drive signal having a phase/frequency corresponding to the phase/frequency of the quadrature phase shifted signal 126 and controlled by the PLL and a maximum amplitude level. In response, oscillation amplitude for the driving mass 14 exponentially increases. The start-up controller circuit monitors the oscillation amplitude signal 130 (providing information concerning the detected amplitude of the mechanical oscillation) to detect when the sensed amplitude increases to a level meeting the first threshold amplitude level, and in response thereto controls transition of the start-up process to the fifth phase 108.

In the fifth phase 108 of start-up, the selection signal 136 output by the start-up controller circuit controls the multiplexer circuit 138 to select the input coupled to the $5^{th}$ driver circuit which is configured to output a drive signal having a phase/frequency corresponding to the phase/frequency of the quadrature phase shifted signal 126 and controlled by the PLL and an amplitude that is automated gain controlled. The start-up controller circuit monitors the oscillation amplitude signal 130 (providing information concerning the detected amplitude of the mechanical oscillation) to drive the oscillation amplitude towards a second threshold amplitude level. In response to the sensed amplitude reaching the second threshold amplitude level, start-up controller circuit controls an exit from the start-up process (for example, to calibration mode, a self-testing mode and/or a normal gyroscope sensing mode).

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A method for start-up of a microelectromechanical system (MEMS) gyroscope, comprising:
   not applying a drive signal to the MEMS gyroscope;
   sensing phase, frequency and amplitude of a residual mechanical oscillation of the MEMS gyroscope while the drive signal is not applied;
   determining if the sensed frequency of the residual mechanical oscillation is a spurious mode frequency that is offset from a resonance frequency of a desired resonant mode;
   determining if a quality factor of the residual mechanical oscillation from the sensed amplitude of the residual mechanical oscillation exceeds a quality factor threshold; and
   when the sensed frequency is determined to be the spurious mode frequency and the determined quality factor is determined to exceed the quality factor threshold, then:
      applying an anti-phase signal as the drive signal to the MEMS gyroscope, said anti-phase signal having a frequency corresponding to the sensed frequency and a phase that is 180° out of phase with the sensed phase of the residual mechanical oscillation.

2. The method of claim 1, further comprising:
   when the sensed frequency is determined to be the spurious mode frequency and the determined quality factor is determined not to exceed the quality factor threshold, then:
      permitting the residual mechanical oscillation to dampen while the drive signal is not applied; and then:
         applying a kicking signal as the drive signal to the MEMS gyroscope to initiate mechanical oscillation.

3. The method of claim 2, wherein said permitting comprises: applying a fixed duration time delay before applying the kicking signal.

4. The method of claim 2, wherein applying the kicking signal comprises applying the kicking signal for a fixed duration of time.

5. The method of claim 2, further comprising, following application of the kicking signal:
   applying a first signal as the drive signal to the MEMS gyroscope to induce mechanical oscillation, said first signal having a frequency corresponding to said sensed frequency, a phase that is 90° out of phase with the sensed phase, and an amplified amplitude;
   then applying a second signal as the drive signal to the MEMS gyroscope to control mechanical oscillation, said second signal having a frequency set by a phase lock loop from a reference signal, a phase that is 90° out of phase with the sensed phase, and an amplitude that is a maximum amplitude of a signal driver for said drive signal;
   sensing an increase in the sensed amplitude of the residual mechanical oscillation to exceed an amplitude threshold level; and
   then applying a third signal as the drive signal to the MEMS gyroscope to control mechanical oscillation, said third signal having the frequency set by the phase lock loop from the reference signal, the phase that is 90° out of phase with the sensed phase, and an amplitude that is automatic gain controlled in response to the sensed amplitude.

6. The method of claim 2, wherein said permitting comprises: waiting until the sensed amplitude of the residual mechanical oscillation dampens to a level below a dampening threshold before applying the kicking signal.

7. The method of claim 1, further comprising:
   determining that the sensed frequency of the residual mechanical oscillation is a resonant mode frequency corresponding to a resonance frequency of a desired resonant mode;
   determining a drive energy of the residual mechanical oscillation from the sensed amplitude of the residual mechanical oscillation; and
   when the determined drive energy is within a first range, then:
      applying a first signal as the drive signal to the MEMS gyroscope to control mechanical oscillation, said first signal having a frequency set by a phase lock loop from a reference signal, a phase that is 90° out of phase with the sensed phase, and an amplitude that is automatic gain controlled in response to the sensed amplitude.

8. The method of claim 7, further comprising:
   when the determined drive energy is within a second range smaller than the first range, then:
      applying a second signal as the drive signal to the MEMS gyroscope to control mechanical oscillation, said second signal having the frequency set by the phase lock loop from the reference signal, the phase that is 90° out of phase with the sensed phase, and an amplitude that is a maximum amplitude of a signal driver for said drive signal.

9. The method of claim 8, further comprising:
   when the determined drive energy is within a third range smaller than the second range, then:
      applying a third signal as the drive signal to the MEMS gyroscope to induce mechanical oscillation, said third signal having a frequency corresponding to said sensed frequency, a phase that is 90° out of phase with the sensed phase, and an amplified amplitude.

10. The method of claim 1, further comprising:
    determining that the sensed frequency of the residual mechanical oscillation is a resonant mode frequency corresponding to a resonance frequency of a desired resonant mode;
    determining a drive energy of the residual mechanical oscillation from the sensed amplitude of the residual mechanical oscillation; and
    when the determined drive energy is within a first range, then:
       applying a first signal as the drive signal to the MEMS gyroscope to control mechanical oscillation, said first signal having a frequency set by a phase lock loop from a reference signal, a phase that is 90° out of phase with the sensed phase, and an amplitude that is a maximum amplitude of a signal driver for said drive signal.

11. The method of claim 10, further comprising:
    when the determined drive energy is within a second range smaller than the first range, then:
       applying a second signal as the drive signal to the MEMS gyroscope to control mechanical oscillation, said second signal having a frequency corresponding to said sensed frequency, a phase that is 90° out of phase with the sensed phase, and an amplified amplitude.

12. The method of claim 1, further comprising:

determining that the sensed frequency of the residual mechanical oscillation is a resonant mode frequency corresponding to a resonance frequency of a desired resonant mode; and applying a first signal as the drive signal to the MEMS gyroscope to control mechanical oscillation, said first signal having a frequency corresponding to said sensed frequency, a phase that is 90° out of phase with the sensed phase, and an amplified amplitude.

13. A start-up controller for a microelectromechanical system (MEMS) gyroscope configured to implement the method of claim 1.

* * * * *